Jan. 13, 1970   G. SCHWEIZER ET AL   3,489,122
DEVICE FOR SETTING AND INDICATING THE RELATIVE
POSITIONS OF SKI-BINDING MEMBERS
Filed Aug. 18, 1964   3 Sheets-Sheet 1
FIG. 1
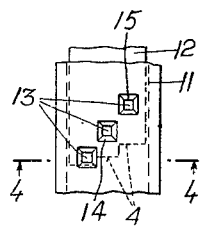
FIG. 2
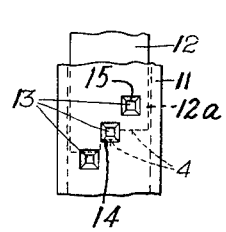
FIG. 3
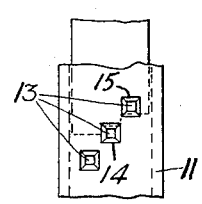
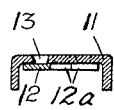
FIG. 4

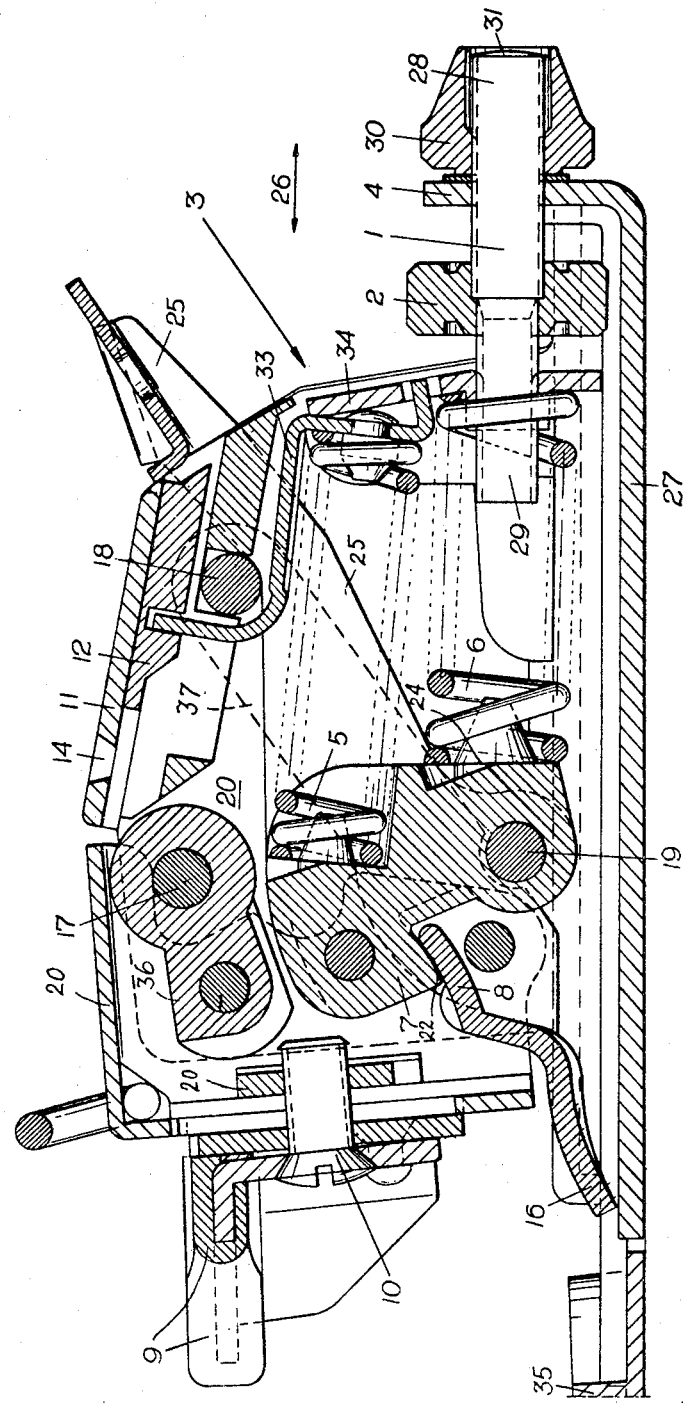

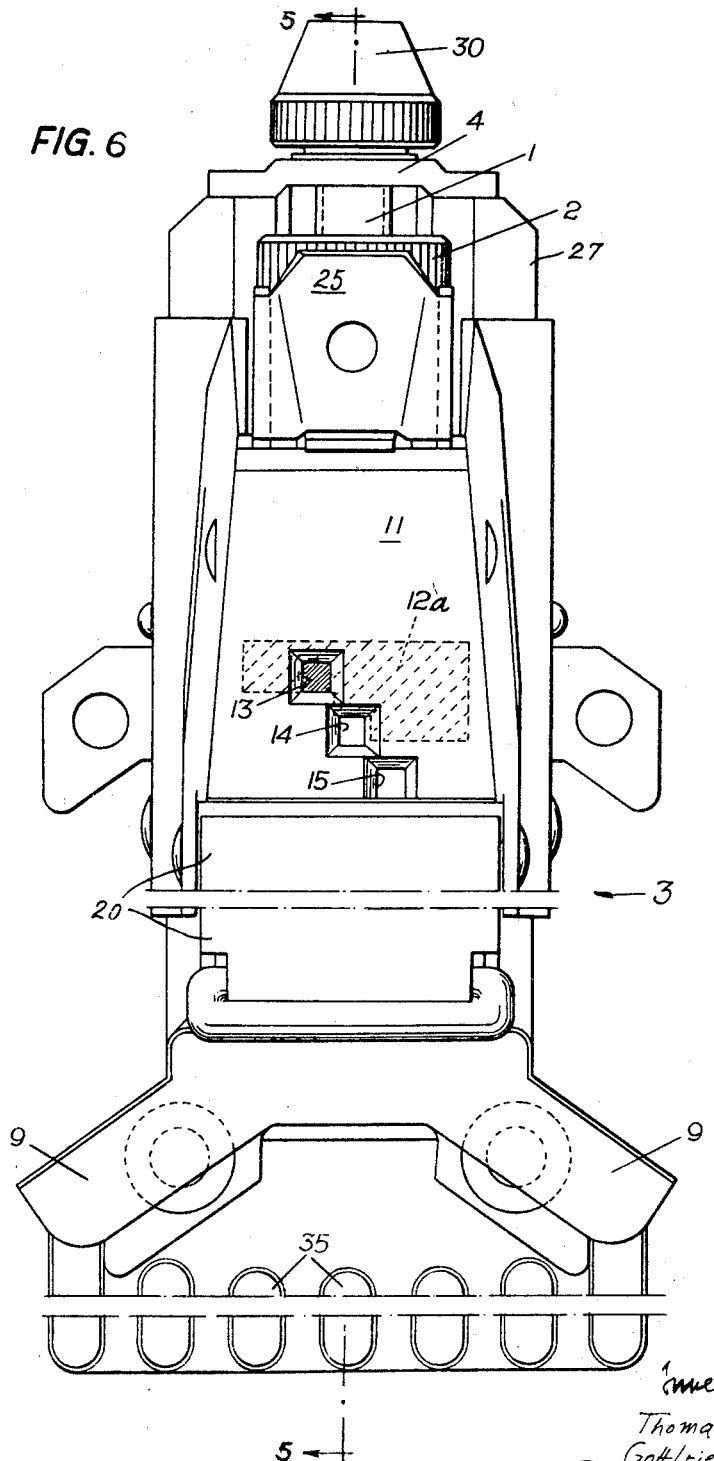

United States Patent Office 3,489,122
Patented Jan. 13, 1970

3,489,122
DEVICE FOR SETTING AND INDICATING THE RELATIVE POSITIONS OF SKI-BINDING MEMBERS
Gottfried Schweizer, Vienna, and Thomas G. Smolka, Schwechat, Austria, assignors to Wiener Metallwarenfabrik Smolka & Co., a firm
Filed Aug. 18, 1964, Ser. No. 390,339
Int. Cl. G09f 9/00
U.S. Cl. 116—135                                4 Claims

ABSTRACT OF THE DISCLOSURE

A device for setting and indicating the relative positions of ski-binding members which comprises a first member and a second member engaging and being mounted for movement relative to the first member. Spring means are arranged for placing at least one of the members under spring pressure and marking means are provided on the members and coordinated to each other.

---

The present invention relates to a device for setting and indicating the relative positions of ski-binding members, which are under the effect of springs.

It is one object of the present invention to provide a device for setting and indicating the relative positions of ski-binding members, wherein the latter are equipped with marks coordinated to each other, in order to render visible the relative positions of said members.

It is another object of the present invention to provide a device for setting and indicating the relative positions of ski-binding members in accordance with the above-mentioned object comprising a spring placing one of the members under pressure and marking means comprising perforations on one member and the marks on the other member visible through the perforations.

With this and other objects in view, which will become apparent in the following detailed description, the present invention will be clearly understood in connection with the accompanying drawing, in which:

FIGURE 1 is a top plan view of two ski-binding members;

FIG. 2 is a top plan view of the two ski-binding members, disclosed in FIG. 1, yet shown in a position different from that shown in FIG. 1;

FIG. 3 is a top plan view of the two ski-binding members, disclosed in FIG. 1, yet shown still in a position different from that shown in FIGS. 1 and 2;

FIG. 4 is a section along the lines 4—4 of FIG. 1;

FIG. 5 is a longitudinal cross-section of the structural elements of the ski-binding members or of the heel-safety holder along the lines 5—5 of FIG. 6; and FIG. 6 is a top plan view of the heel-safety holder.

The relative position of ski-binding members, which are under the effect of springs, are often difficult to be recognized. This position is decisive, for instance, in safety bindings, by the setting of the safety means (namely the setting of an overload, at which point the safety binding opens or releases). The present invention is concerned with the problem to permit the setting of corresponding members relative to each other, whereby the setting be clearly indicated.

Referring now to the drawings, and in particular to FIGS. 1-4, the device designed in accordance with the present invention comprises a first plate-like ski-binding member 11 and a second indicator plate-like ski-binding member 12, which ski-binding member 11 and indicator plate-like ski-binding member 12 are displaceable relative to each other. The member 11 is equipped with perforations or cut-outs 13, 14 and 15, while the member 12 has a step-shaped margin formation 4'. The member 12 has, for instance, a glaring red color face or marking 12a.

In the position indicated in FIG. 1, the glaring red face or marking 12a appears in all three perforations or cut-outs 13, 14 and 15, while the next position, shown in FIG. 2, indicates that the two upper perforations 13 and 14 only disclose the glaring red face or marking 12a of the member 12 and in the last position, shown in FIG. 3, only the uppermost perforation or cut-out 13 discloses the glaring red color face 12a of the member 12.

The relative position between the members 11 and 12 is thus made clearly recognizable, as stated at first by making visible three red faces, two red faces and, finally, one red face, depending upon the relative position of the ski-binding members 11 and 12.

The members 11 and 12, set forth above, can be disposed, for instance, on a rear tightening member 3 of a ski, as disclosed in FIGS. 5 and 6, and already disclosed in applicants' copending patent applications Ser. No. 449,488, which matured into Patent No. 3,351,354 dated Nov. 7, 1967, whereby one or the other of the members 11 and 12 is under the effect of a spring. After setting the relative position between the members 11 and 12, the skier recognizes simply the set safety, whereby the different positions according to FIGS. 1-3 can be coordinated to a heavy, medium and weak overload, respectively, which determines the force for automatic release of the binding. The possibility of a simple and safe setting and indication in this direction is of utmost importance in connection with safety bindings, since otherwise, if the setting is not made proper, the purpose of the safety binding would be lost.

As shown in the drawing and in particular in FIG. 4, the element 1 is of U-shaped cross-section, and the element 2 is of a width equal to that of the U-shaped base and engages and is guided by the latter for a relative longitudinal movement relative the members 1 and 2.

In the application of the indicating and setting device to a ski-binding, the first ski-binding member 1 constitutes a cover plate which has a plurality of cut-outs or openings through which appropriate portions of the second binding member 2 constituting an indicator plate, can be visualized. The cover plate is movable relative to the indicator plate and at least one of the plates is spring biased.

Referring now again to the drawings, the heel-safety holder comprises a base plate 27 attached to the ski (not shown) by conventional means (FIGS. 5 and 6). The base plate has an upright limb 4 at its end remote from the ski boot. It will be understood by those skilled in the art that the ski is also provided with a front or toe binding or abutment (not shown), the boot being clamped between the latter and the heel safety holder 3.

The safety holder 3 has a frame 20, the frontal portion of which has an upper member means constituting a heel holder 9 attached thereto by conventional fastening means, e.g., as for instance by a threaded bolt 10 (FIG. 5). The holder 9 is pivotally linked to a first pivot or fulcrum point 17 by means of a link or lever 36, also constituting part of the upper member means, which fulcrum point is mounted in the frame 20. In a similar manner, a second pivot or fulcrum point 18, likewise mounted in the frame 20, has a lower member means constituting another link or lever 37 pivotally connected thereto, and the lower member means also constitutes a spur member 16 linked to the end of the latter. While the angular relation between the holder 9 and the lever 36 is variable, the spur 16 is in a fixed angular relation with respect to the lever 37.

A third pivot or fulcrum point 19 allows angular movement of a lever 25 to which is rigidly connected a link 23. The latter has fixed thereto a catch member 7 which has a complementary member 8 attached to or forming part of the aforementioned spur 16. Members 7 and 8 together form a safety detent catch device having opposite surfaces 22 adapted for mating frictional engagement, with member 8 constituting a detent portion of heel holder 9.

A relatively strong spring 5 is interposed between the catch member 7 and a coupling member 33. Another spring 6, somewhat weaker than spring 5, is provided between the rear surface 24 of the link 23 and a cover plate 34.

A single actuating member in a form of an actuating wheel 2 is provided which is displaceable by rotation on a threaded bolt 1. The outer end 28 of the bolt 1 has a right-handed thread, while its inner end 29 carries a left-handed thread. The former passes through an appropriately threaded bore of upright limb 4, while the latter end is in meshing engagement with an inwardly turned threaded sleeve portion of the cover plate 34. Before actuating the wheel 2, a locking nut 30 threadedly engaging the outer end 28 of the bolt 1 should be loosened; once the proper adjustment has been made, the nut 30 can be tightened again against the limb 4. To prevent the locking nut 30 from being inadvertently lost, the end 28 of the bolt 1 has an upset portion 31.

Rotation of bolt 1 results in an adjustment of the system which corresponds to the sum total of the thread leads at both ends. A small angular rotation of the actuating wheel 2 will therefore, provide an efficient adjustment of the safety holder system. The adjusting structure takes but very little space and is not subject to disturbances owing to cold weather or snow.

For an added, easy adaptation of the safety holder 3 to various sizes of ski boots, the heel holder 9 can be swivelled about its fastening member 10, with respect to the frame 20, by a total of approximately 180°. This can be done upon loosening the member 10, allowing thereby the holder 9 to be moved between two extreme displaced positions (not shown). An additional fine adjustment is provided, in a known manner, by a relative movement along a serration 32, again upon having loosened the fastening member 10.

As viewed lengthwise of the base plate 27, a serrated foot plate 35 is attached in front of the spur 16. Before the skier allows the elements 9 and 16 to engage the rear portion of his boot, he can strip off any snow that might have got stuck to the heel of the ski boot. This will make for the safe fitting of the ski boot's heel in the safety holder 3. The distance between the forward edge ef the spur 16 and the upward edge portions of the foot plate 35 is made sufficiently wide to accommodate the heel, even of the largest ski boots.

If the skier mounts his ski, inserting his boot between the front toe unit or clamp and the present heel safety holder 3, the frame 20 with the mouth opening formed by elements 9 and 16 will be displaced rearwardly, that is, toward the right-hand side, as viewed in the drawings. The springs 5 and 6 are substantially uniformly compressed. There are, however, elements which do not take part in the rearward movement, such as the coupling member 33 and the cover plate 34. The lower, rearwardly pointing end portion of the former fits into an appropriate aperture of the cover plate 34, while the upper, more forwardly end of said member 33 engages a recess of an indicator plate 12. The latter likewise does not take part in the rearward displacement when the skier mounts his ski. This is brought about because the threaded sleeve of the plate 34 is immobilized, together with the aforementioned other members 33 and 12, by the threaded inner end 29 of bolt 1.

A cover plate 11, substantially parallel with the plate 12, is held in a stationary manner on the safety holder 3 by any conventional means (not shown). As shown in FIG. 6, this plate has cut-outs or openings 13, 14 and 15, through which appropriate portions of the indicator plate 12 can be visualized. It is also shown in broken lines that the top surface of the plate 12 is provided with a color marking 12a which may be, e.g., in glaring red or some other conspicuous color. Preferably, the outlines of the color marking, as well as the openings 13–15 are arranged in stepwise fashion, as stated above. It will be understood that the forward edge of the indicator plate 12 may be cut out in stepwise fashion, the entire frontal portion of the plate being provided with the glaring paint.

In a similar fashion, the structure described herein allows selective indication of "weak," "medium" and "strong" adjustments. Since the strength of the releasing action is inversely proportional to the distance between the toe and heel units, it will be understood that FIG. 6 illustrates the weakest setting in which only the opening 13 shows the color marking 12a therethrough. In case of a medium setting, both openings 13 and 14 will display the colored surface; finally, when all three openings 13, 14 and 15 appear in red, the strongest setting prevails.

Springs 5 and 6, member 7, bolt 1, wheel 2, and cooperating housing portions, and indicator mechanism 11 and 12 comprise a spring bias means. The spring bias means with member 7, and the link 23 and surface 24 constitute a movable detent means, with member 7 being the active part thereof engaging the detent portion 8 of the upper heel holder 9.

The present invention is not limited to the shown embodiments. The structure disclosed in FIGS. 1 to 4 is particularly well applicable for the setting for safety front tighteners, as well as for the setting of resilient members between which the shoe is clamped on the ski (front and rear tighteners, respectively, in ski-bindings having no cables).

The present invention is, however, also possible in construction members which do not pertain to ski-bindings, thus, for instance, for the setting of an indicator in tool machines, safety devices and others. It is also possible to provide finally subdivided settings with the present invention, since also parts of the openings or perforations can be used for the setting. These openings or perforations can assume any suitable shape, as, for instance, rectangular, square, round, oval or the like. Furthermore, the openings or perforations can be disposed in a single line or can be regularly or irregularly set off.

While we have disclosed several embodiments of the present invention, it is to be understood that these embodiments are given by example only and not in a limiting sense, the scope of the present invention being determined by the objects and the claims.

We claim:
1. In a device for setting and indicating the relative positions of ski-binding members,
    a ski tightening device,
    a first plate-like ski binding member, constituting a cover for said ski tightening device,
    a second indicator plate-like ski binding member slidingly engaging and movable in parallel planes relative to said first plate-like ski binding member,
    spring means in said ski tightening device biasing one of said members relative to the other of said members,
    marking means provided on said members and co-ordinated to each other, and
    said marking means comprising perforations provided in said first plate-like ski binding member and color markings on said indicator plate-like ski binding member, visible through said perforations.
2. The device, as set forth in claim 1, wherein
    at least three marking means are provided on at least one of said members in order to set a strong, median and light safety positions, respectively, on said ski binding.

3. The device, as set forth in claim 1, where said members are linearly displaceable relative to each other.

4. The device, as set forth in claim 1, wherein said markings on said indicator plate-like member comprise a glaring color.

References Cited

UNITED STATES PATENTS

| | | | |
|---|---|---|---|
| 3,172,677 | 3/1965 | Marker | 280—11.35 |
| 3,186,727 | 6/1965 | Hatlapa | 280—11.35 |
| 3,337,225 | 8/1967 | Smolka et al. | 280—11.35 |
| 3,351,354 | 11/1967 | Smolka et al. | 280—11.35 |
| 1,662,503 | 3/1928 | Krieger | 116—133 |
| 1,757,949 | 5/1930 | Schlaich | 116—129 XR |
| 2,188,744 | 1/1940 | Turner | 116—134 |
| 2,226,973 | 12/1940 | Grigsby | 116—133 XR |
| 2,782,403 | 2/1957 | Pearce | 116—135 XR |

FOREIGN PATENTS 629,396  12/1961  Italy.

LOUIS J. CAPOZIA, Primary Examiner

U.S. Cl. X.R.

280—11.35

UNITED STATES PATENT OFFICE
CERTIFICATE OF CORRECTION

Patent No. 3,489,122          Dated   January 13, 1970

Inventor(s) Gottfried Schweizer and Thomas G. Smolka

It is certified that error appears in the above-identified patent and that said Letters Patent are hereby corrected as shown below:

In the heading of the patent specification, line 6 for "fabrik Smolka & Co., a firm"

read -- fabrik Smolka & Co., a corporation of Austria --

SIGNED AND
SEALED
JUN 23 1970

(SEAL)
Attest:

Edward M. Fletcher, Jr.
Attesting Officer

WILLIAM E. SCHUYLER, JR.
Commissioner of Patents